G. W. PICKARD.
APPARATUS FOR MEASURING TELEPHONE CURRENTS.
APPLICATION FILED JAN. 6, 1919.
1,324,465.
Patented Dec. 9, 1919.
2 SHEETS—SHEET 1.
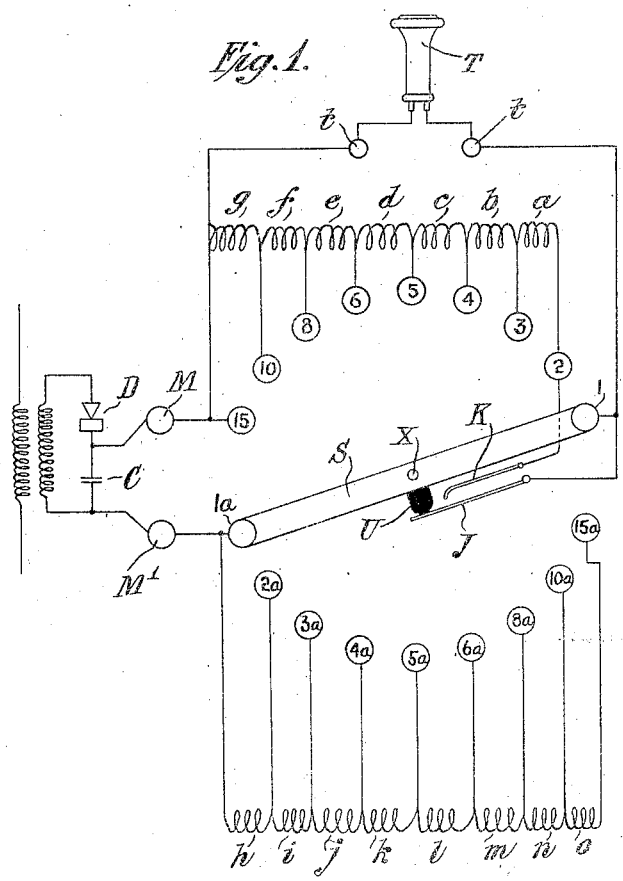
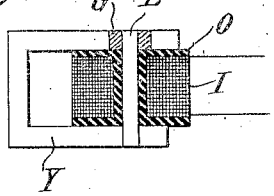
WITNESS
INVENTOR
Greenleaf Whittier Pickard
BY
Philip Farnsworth ATTORNEY

UNITED STATES PATENT OFFICE.

GREENLEAF WHITTIER PICKARD, OF NEWTON CENTER, MASSACHUSETTS, ASSIGNOR TO WIRELESS SPECIALTY APPARATUS COMPANY, OF BOSTON, MASSACHUSETTS, A CORPORATION OF NEW YORK.

APPARATUS FOR MEASURING TELEPHONE-CURRENTS.

1,324,465.

Specification of Letters Patent.

Patented Dec. 9, 1919.

Application filed January 6, 1919. Serial No. 269,774.

*To all whom it may concern:*

Be it known that I, GREENLEAF WHITTIER PICKARD, a citizen of the United States of America, and a resident of Newton Center, county of Middlesex, and State of Massachusetts, have invented certain new and useful Improvements in Apparatus for Measuring Telephone-Currents, the principles of which are set forth in the following specification and accompanying drawings, which disclose the form of the invention which I now consider to be the best of the various forms in which the principles of the invention may be embodied.

This invention relates to improvements in measuring the degree of audible effect of telephone currents, i. e., in measuring their strength (intensity) relative to each other, or in measuring their intensity in terms of multiples of such an operation of the telephone diaphragm as is just barely audible to the ordinary person. The apparatus for such purpose (invented by me, but not patented) has been termed a direct reading audibility meter, and the proper functioning of such a meter is of most particular value in radio communication (telegraphic and telephonic) wherein the condition controlling the intensity of the received signals at a given station are widely different at different times, and wherein the ordinary electromagnetic telephone receiver is employed as an indicator of received signals which have been transmitted by high frequency radio waves.

The object of the invention is to produce a meter by which accuracy of measurement can be obtained under all circumstances and conditions of use.

Figure 3:
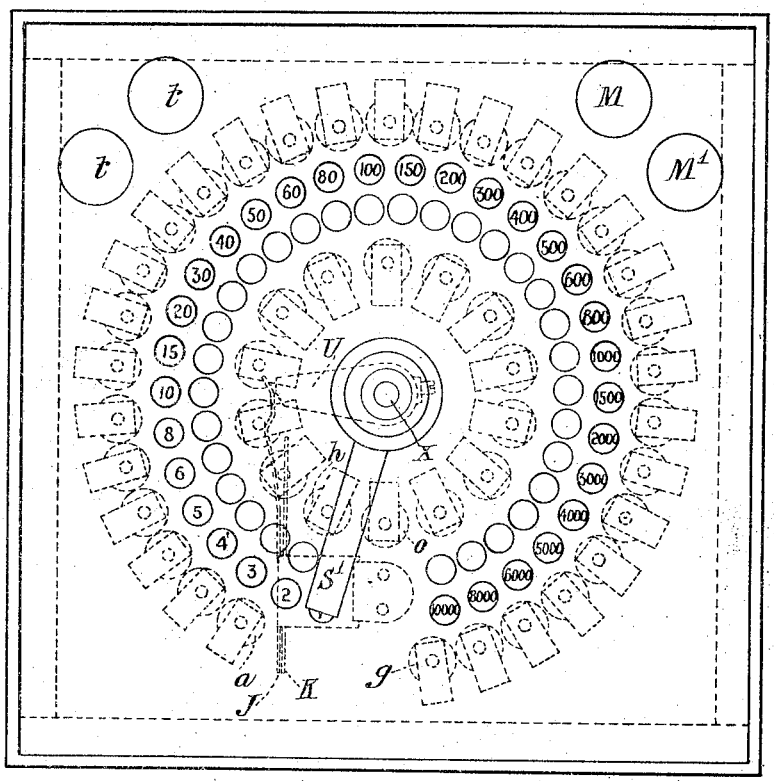
Figure 4:
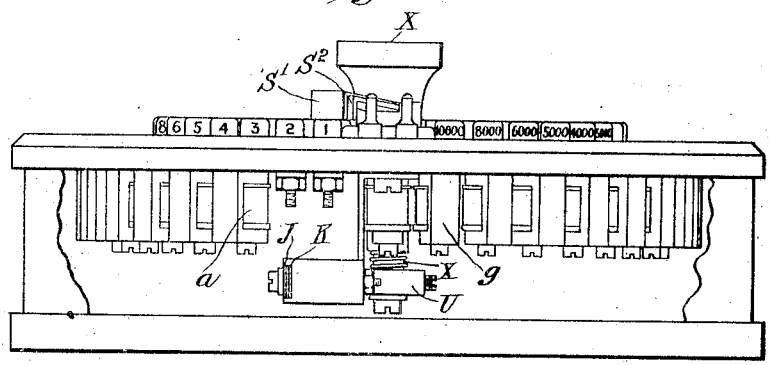

Of the drawings Figure 1 is a diagrammatic illustration of the invention; Fig. 2 is a sectional elevation showing the construction of the impedance coils employed therein; Fig. 3 is a plan of a commercial embodiment of the invention, showing the top of the box or casing for the electrical apparatus; and Fig. 4 is an elevation of said embodiment, a part of the side of the casing being removed in order to indicate the mechanical disposition of the apparatus inside.

The currents to be measured are those which flow in the circuit of the main binding posts M, M¹ (Fig. 1) of the measuring apparatus or meter. These currents are assumed to come from the circuits at the left. They are those which would be used for the normal receiving operation of telephone T (such as the ordinary electromagnetic instrument) in said main circuit M, M¹, when the meter is not connected thereto. The telephone T shown as connected to the meter is usually the same telephone receiver which is normally used for receiving, independently of the meter, with the circuit at the left of M, M¹, Fig. 1. When this telephone is connected to the meter binding posts $t, t$, as shown, it is then the instrument appertaining to the meter. In shunt to said telephone T are impedance coils $a$—$g$, which are controlled by a switch S operating over switch-points 1—15. When switch S contacts with point 1, no impedance coils are in circuit, and telephone T will operate as in its normal receiving use; therefore, if desired, the meter may be left in circuit permanently, with the telephone connected for normal use in the receiving circuit, provided the switch S be on point 1, so that the telephone may be used as normally, and so that at any desired moment the meter may be used by merely operating switch S.

In the use of the meter the operator listens in as usual at telephone T, but he also moves switch S over points 1—20 until the sound made by the telephone diaphragm is just barely audible, which indicates that all the current not traversing the telephone and causing that slight sound is flowing through the shunt $a$—$g$. The numbering on the particular switch-point with which switch S at that time contacts will indicate the measure of the total current supplied in terms of audibility, i. e., will indicate the multiples of its ability to just audibly vibrate the telephone diaphragm. A position of switch S on switch point 1, or on any other switch point, indicates the degree of audibility of the total supplied current at that time, only when the sound from the telephone is just barely audible under those conditions. Thus, when switch S is on point 1 and the telephone is being used for ordinary receiving, its response to signals may be of any intensity depending only on the strength of the signals.

Switch S controls also another series of impedance coils $h$—$o$ (switch-points $1a$—$15a$ which coils are termed "compensating coils" and assist shunt coils a—g in obtaining accuracy of the meter readings.

Switch S is pivoted at X and in its movement thereon controls both sets of coils, the upper set a—g and the lower set h—o, so that both sets are operated in fixed relation to one another to permit the timely functioning of one set of coils relative to the other.

Each of the coils a—o comprising both sets is an impedance or inductance coil constructed to resemble telephone T in electrical functioning (but these coils have no vibrating diaphragm); that is, the electrical action of each impedance coil resembles the electrical action of the telephone coil, quite irrespective of the variations of the shunt coils a—g. The object of this is to insure the same relative values of current for any and all frequencies of the current to be measured, in all the circuits of the meter; that is, to cause the effective inductance and resistance of all the meter circuits to be changed to exactly the same extent by changes in the frequency of the supplied current which is to be measured.

Fig. 2 shows a construction for said impedance coils to permit said functioning like the telephone in the case where telephone T is one of the electromagnetic telephone receivers now ordinarily used. The impedance coil of Fig. 2 resembles the coil of the telephone T in having a pole-piece L of similar material and dimensions, an insulating spool O of similar dimensions, a winding I of insulated wire, and a soft iron yoke Y partly closing the magnetic circuit of the pole-piece L but separated from it by an air gap G which is filled with an insulator or with non-magnetic material such as brass. The yoke Y and air-gap G are similar to the corresponding construction of the telephone in respect of magnetic properties, pursuant to the general object of producing in compact form an electric and a magnetic circuit which shall be a substantial duplicate of the electromagnetic telephone T. The proper amount of magnetic leakage in the magnetic circuit of the impedance coil, that is, the proper gap G depends upon the leakage or gap in the telephone instrument T. Some designs of electromagnetic telephones have greater air-gaps and leakage than others, and in order to produce a meter best adapted for use with a given design of telephone receiver, it is necessary to provide a corresponding air-gap for the impedance coils. This may be done by calculating the phase angle of the telephone from data obtained by measuring its inductance and resistance at one or more frequencies of current traversing its winding, then constructing an impedance coil like that of Fig. 2, giving it some arbitrary gap G and arbitrary depth and size of winding I, and making it otherwise the same as the telephone, as described above, for the purpose of simulating the telephone in respect of having the same variation in eddy-current and hysteresis losses with change of frequency of applied currents. This impedance coil is then measured for its effective inductance and resistance and from that data the phase angle is calculated. If the phase angle of the impedance coil then differs from that of the telephone, its air-gap G will be varied until, upon re-measurement of the coil, and re-calculation, the coil is shown to have the same phase angle as the telephone. In general, however, the meter of this invention is not an apparatus of extreme precision (being used in making aural estimates of sound-intensity), and therefore it is not necessary to adjust any of the above constants of the impedance coils any closer than within a few per cent. of their best value theoretically. In short, the impedance coil of Fig. 2 is substantially a duplicate (so far as concerns electric and magnetic properties) of the electromagnetic telephone T of the meter, substantially the same amount of magnetic leakage being provided in each case. As a result of such substantial duplication of impedance coil and telephone T, the effective inductance and resistance of the impedance coil will change, for all different frequencies of the currents to be measured which traverse them, to exactly the same extent as the changes in resistance of the winding of the telephone T itself for such different frequencies. Furthermore, by employing the same kind of wire for winding I of the impedance coil as that used for the winding of telephone T (such as copper wire) changes in temperature will affect the resistance of the impedance coil to exactly the same extent as they will affect the resistance of telephone T. The number of turns of wire on spool O of the impedance coil, and even the diameter of such coil, may not be the same as in telephone T, but they may be determined by the requirements of the design of any given type of the meter in respect of inductance and resistance of any given one of all of the impedance coils a—o.

The upper set of coils a—g (Fig. 1) in series with each other constitute a shunt relative to telephone T.

The lower set of coils h—o in series with each other, constitute an arrangement in series with both the parallel branch circuits T and a—g respectively.

The sum of the impedance of shunt coils a—g (Fig. 1) is made equal to the impedance of telephone T. The impedance of any one of these shunt coils a—g is at the discretion of the designer and depends on how many units of audibility it is desired to have indicated by the numbering on a given switch-point. In the case shown, certain switch points are omitted as follows, as indicated by the marking on the switchpoints, 7, 9, 11—14. The reason for this omission will be explained in connection with the calculation and calibration of the impedance coils. Switch points of numbers higher than 15 are omitted from Fig. 1 only for simplicity of diagrammatic illustration. In Fig. 1 the proper values of the coils are not attempted to be shown.

In the position of switch S shown, in contact with point 1, which is the position indicating unit audibility when the telephone response is barely audible, the shunt coils, $a$—$g$ are cut out of shunt relation to telephone T and all of the current to be measured is passing through telephone T in the main circuit of the binding posts M, M¹. This switch position on point 1 is the position when the meter is connected in circuit but not necessarily being used, the telephone being then in normal receiving use, and having an intensity of operation wholly independent of the meter and dependent solely on conditions outside the meter, such that the intensity of response may be many times audibility notwithstanding that switch S is in contact with unit audibility point 1.

In the position of switch S shown, on points 1 and 1ᵃ, shunt coils $a$—$g$ are cut out of circuit by any suitable arrangement such as that shown as follows (Figs. 1 and 3). An insulating projection U from switch S pushes a contact spring J out of contact with another contact spring K, said two springs being connected respectively to telephone T and to the series of shunt coils $a$—$g$. In all positions of switch S other than on points 1 and 1ᵃ springs J and K contact with each other so that a greater or less number of the coils $a$—$g$ are cut in effective shunt to telephone T, the number of coils so cut in being dependent on the particular switch point of 2 to 15 with which switch S is in contact.

In order to measure audibility in respect of any given current, the operator moves switch S from switch-point to switch-point until he can just barely hear the sound in the telephone. In this operation coils $a$—$g$ are successively cut in or out of effective shunt to telephone T so that more or less of the current to be measured is diverted from the branch containing telephone T to the shunt impedance coils. The other end of switch S contacts with points 1$a$—15$a$ to control the compensating impedance coils $h$—$o$. In the switch position shown, with the switch ends respectively on points 1 and 1$a$, none of either the upper or lower set of impedance coils is in circuit.

When switch S makes contact with points 2 and 2$a$, springs J and K contact with each other and all of the shunt coils $a$—$g$ are connected in shunt to telephone T; and also one ($h$) of the lower set of coils is connected in series with said two shunts. Coil $h$ has an impedance equal to half that of telephone T (and therefore half of shunt coils $a$—$g$, which have a total impedance equal to the impedance of telephone T). In this position of switch S on points 2, 2$a$ therefore, the impedance in the main circuit, of the parallel branches T and $a$—$g$, is half what the impedance was in the main circuit when the switch S was in contact with points 1 and 1$a$, (when there was no impedance in shunt to the telephone) $i.$ $e.$, it is half the impedance of telephone T. Hence the inclusion of series coil $h$, which was half the impedance of telephone T, maintains the same total impedance in the main circuit as before, notwithstanding that in this position of the switch at 2, 2$a$ half of the current is being diverted from telephone T and through shunt coils $a$—$g$.

When switch S makes contact with point 3, shunt coil $a$ is removed from the shunt to telephone T and is shifted to the telephone branch circuit itself. At this time series coil $i$ is added to coil $h$ in series therewith, in order to compensate for said shift of shunt coil $a$. This addition of coil $i$ is effected by the contact of switch S with point 3$a$. Similarly, for the rest of positions of switch S, each of the remaining compensating coils $j$—$o$ has its impedance of such value that the impedance of the main circuit is always the same, with the result that the current to be measured always remains constant and the meter to that extent gives accurate readings. The values of all these coils depend upon the direct current resistance of the particular telephone receiver used and they are calculated according to formulæ specified hereinafter.

In Fig. 1 the current to be measured flows in a circuit derived from a condenser C which is connected in a local circuit of a radio receiving system, as indicated diagrammatically; condenser C being in series with a radio detector D. While the improved meter is extremely useful in radio work where the audible frequencies may differ within wide limits on different occasions of use of the meter, nevertheless this meter may be used to measure any telephone currents wherever existing, such as on the ordinary wire lines.

In Fig. 1 the audibility steps are shown only from 1—15. In radio work, however, where the intensity or audibility of received signals differs within wide limits while using the meter, a much larger number of steps is preferred. The steps preferably also are so proportioned as to give increases of equal percentages. Inasmuch as the human ear has difficulty in discriminating between sounds which do not differ by more than twenty per cent. in intensity, an ideal scale would be 1; 1, 2; 1, 44, etc., each step being twenty per cent. higher. But as this gives a scale of fractional audibility numbers, a scale is preferred for practical use as follows:—1, 2, 3, 4, 5, 6, 8, 10, 15 (as in Fig. 1) and thence by increases of ten units each up to 60 and then by 20 units each, etc., (as shown in the first table below and in Fig. 3) i. e., so as to give an average interval increase of thirty four per cent. between adjacent switch points. For more precise work, the user can often place the audibility of received signals by ear, as intermediate two switch points, giving thereby an average interval of seventeen per cent.

In the design of a meter embodying the invention, the first step is to design an impedance coil (Fig. 2) having the same phase angle as that of the telephone receiver, i. e., having the proper relation between effective resistance and inductance, all as described first above. The next step is to provide for the switch-points as described just above. The remaining step is to arrange for the proper direct current resistance of each of the impedance coils. This latter is done, first by calculating the desired resistance, and then by leaving a sufficient length of wire in the winding of each coil to provide the proper resistance as determined by measurement.

The calculation of the proper resistance for the impedance coils may be assumed for the purpose of this description to be on the basis of a telephone winding having a resistance of 2000 ohms,—a common value for telephones used in radio.

Where R is the telephone resistance, and N is the numerical value of the switch point, the formula for the calculation of the resistance of the total shunt impedance when switch S contacts with the particular switch point, is $2R \div N$. For example, take switch point 3, of Fig. 1. When switch S contacts with that point 3, coils $b$—$g$ are in shunt. The total resistance of those coils then is, according to the above formula, $4000 \div 3$, which equals 1333 ohms. Similarly for the total resistance of the coils in shunt at each of the other switch points. The resistance for each coil is obtained by simple subtraction.

The formula for the resistance of the series compensating coils $i$—$o$, that is, for the total resistance of all those coils in circuit at any one switch point, is $$\frac{R}{2} - \frac{1}{\frac{1}{2R - \frac{2R}{N}} + \frac{1}{\frac{2R}{N}}}$$

The reason for this formula is as follows. At any given switch point beginning with 3, a right hand portion of the shunt coils is in series with telephone T, and the left hand portion of the shunt coils is in shunt to the telephone. The resistance in the main circuit M, M¹, at any time, so far as concerns the resistance in the telephone branch and in the shunt to the telephone, is the sum of two resistances in multiple. And the sum of multiple resistance is the reciprocal of the sum of their reciprocals. A simple example under this formula is in the case of switch point $2a$; for when switch S is at this point it is also at point 2 where all the shunt coils are in shunt to the telephone, and as they have a total resistance equal to that assumed for the telephone (2000 ohms), it is obvious that compensating coil $h$ (included in series at switch point $2a$) should have a resistance of 1000 ohms. And that is the result of substituting in the above formula, 2000 for R and 2 for N and adding 1000 for $h$ to the result. Similarly the proper sum of the resistances of series coils $h$ and $i$, (included in series at point $3a$) is, found to be 1112 ohms by substituting 2000 and 3 for R and N in the above formula and adding 1000 for $h$ to the result. That is to say the total resistance in the compensating circuit is the resistance of the coil $h$ plus the resistance called for by the formula.

The following table contains the resistance of the shunt coils of a form of meter embodying the invention and now in extensive use. The telephone had 2000 ohms resistance and the meter was adapted to it by having 2000 ohms in the total shunt coils. In this table, (which appertains to the particular commercial embodiment shown in Figs. 3 and 4) the numbers in the left hand column indicate the switch points in Fig. 1 (and 23 additional switch points); the middle column contains the total resistance of all the coils in shunt to telephone T, at the switch points of the first column; and the right hand column specifies the lettering in Fig. 1 of the coils so cut in (so far as shown in Fig. 1).

| Switch points. | Ohms | Shunt coils in Fig. 1. |
|---|---|---|
| 1 | 0 | None. |
| 2 | 2000 | a—g |
| 3 | 1333 | b—g |
| 4 | 1000 | c—g |
| 5 | 800 | d—g |
| 6 | 667 | e—g |
| 8 | 500 | f—g |
| 10 | 400 | g |
| 15 | 267 | Etc. |
| 20 | 200 | Not shown in Fig. 1. |
| 30 | 133 | |
| 40 | 100 | |
| 50 | 80 | |
| 60 | 67 | |
| 80 | 50 | |
| 100 | 40 | |

| Switch points. | Ohms. |
|---|---|
| 150 | 26.7 |
| 200 | 20.0 |
| 300 | 13.3 |
| 400 | 10.0 |
| 500 | 8.0 |
| 600 | 6.67 |
| 800 | 5.00 |
| 1000 | 4.00 |
| 1500 | 2.67 |
| 2000 | 2.00 |
| 3000 | 1.33 |
| 4000 | 1.00 |
| 5000 | 0.80 |
| 6000 | 0.67 |
| 8000 | 0.50 |
| 10000 | 0.40 |

The resistance of any one coil can be obtained by subtraction.

The following table gives the resistance of the series compensating coils $h-o$, etc., of Fig. 1, in the same meter as the above table, adapted to the same telephone, of 2000 ohms.

| Switch points. | Ohms. | Series coils in Fig. 1. |
|---|---|---|
| 1a | 0 | None. |
| 2a | 1000 | $h$ |
| 3a | 1112 | $h-i$ |
| 4a | 1250 | $h-j$ |
| 5a | 1358 | $h-k$ |
| 6a | 1466 | $h-l$ |
| 8a | 1562 | $h-m$ |
| 10a | 1640 | $h-n$ |
| 15a | 1752 | Etc. |
| 20a | 1810 | Not shown in Fig. 1. |
| 30a | 1872 | |
| 40a | 1902 | |
| 50a | 1922 | |
| 60a | 1934 | |
| 80a | 1950 | |
| 100a | 1960 | |
| 150a | 1974 | |
| 200a | 1980 | |
| 300a | 1986 | |
| 400a | 1990 | |
| 500a | 1992 | |
| 600a | 1994 | |
| 800a | 1995 | |
| 1000a | 1996 | |
| 1500a | 1997 | |
| 2000a | 1998 | |
| 3000a | 1999 | |
| 4000a | 2000 | |
| 5000a | 2000 | |
| 6000a | 2000 | |
| 8000a | 2000 | |
| 10000a | 2000 | |

In the commercial embodiment of Figs. 3 and 4, the two sets of shunt and series impedance coils are located in two annular groups, the shunt coils $a-g$ in the outer group and the series coils $h-o$ in a concentric inner group (Fig. 3). These coils are supported on the lower side of the cover of the casing (Fig. 4). On top of the cover are mounted the switch points. The outer annular series of switch points 1 to 10,000 are for the shunt coils $a-g$; and the inner concentric series of switch points are for the series coils $h-o$. The switch here is modified in accord with the different form of arrangement of coils and switch points as compared with Fig. 1. Here the switch instead of extending on opposite sides of its pivot X, as in Fig. 1, has two parts $S^1$, $S^2$, (Fig. 4) extending from the same side of its pivot X. These two parts are electrically connected together at the pivot X, and their outer ends contact respectively with the outer and inner annular series of contact points. Parts J, K and U of Figs. 3 and 4 correspond with the parts so lettered on Fig. 1 as described above.

My prior audibility meter, on which this invention is an improvement, was inaccurate in measurement, such inaccuracy having been due to causes which I conceived and therefore proceeded to eliminate by the provision of modified constructions. The prior meter consisted merely of a variable ohmic resistance shunted across the telephone terminals, and proportioned to the resistance of the telephone, and provided with a switch to progressively vary the amount of resistance in shunt to the telephone.

My conception on which the invention is based was that the non-inductive character of the shunt of the prior meter was one cause of inaccuracy, and that accuracy would be increased if the shunt consisted of impedance coils, electrically similar to the telephone receiver, and this for the following reasons as I conceived them. Telephone currents, being alternating or pulsating, divide between the telephone and the shunt in a ratio which depends on the ratio of the impedance of the two branch circuits. The resistance of the branch including the telephone is chiefly that of the impedance of the telephone winding itself, and that impedance is a function of the frequency of the current to be measured, and hence variable. Therefore, with a shunt consisting of a simple non-inductive resistance, the audibility readings would be reliable for only one frequency. The above I conceived to be one reason for the inaccuracy of the prior meter; particularly when used to measure telephone currents in radio where they are of various widely different frequencies.

Another reason which I conceived to be accountable for the inaccuracy of the prior meter was that the variation of the resistance shunt caused an alteration of the current to be measured, due to the fact that the detector circuit, to which the meter-telephone is connected, usually has a high resistance of an order comparable with that of the telephone receiver itself. In certain cases in radio, as when the detector employed was of the audion or thermionic type, the change in impedance and resistance in the circuit of the plate or of the wing of the audion, which resulted from a variation of the resistance shunt, was usually accompanied by a change of not merely the intensity but also the quality or pitch of the response or note of the telephone receiver, which, of course, made the meter readings meaningless, because the effect of the change in the note on the ear of the operator prevented a proper aural determination by him of the degree of intensity of the response. My further conception on which the invention is based, was that although the shunt of the prior meter would not permit accuracy in measuring the current desired to be measured, yet increased accuracy might be obtained by providing compensating resistances which would maintain a constant resistance to and therefore a constant value of the current to be measured.

The inaccuracy of the prior audibility meter is now fully accounted for by the above causes, because the present invention, which eliminates such causes, has been proved to provide complete accuracy. The improved meter is adapted to measure accurately the audibility of any telephone current, no matter what the frequency may be. The variable shunt resistance in the form of impedance like that of the telephone itself, causes the current to be measured to divide between the telephone and the shunt resistance in a ratio dependent solely on the amount of resistance in the parallel circuits, and not at all upon the frequency of the current to be measured. Also the provision of the series compensating impedance coils causes the total impedance of the main circuit (and in a radio use, of the detector circuit) to be kept constant throughout all variations of the shunt to the telephone receiver, so that the current to be measured is kept constant throughout such variations.

The disclosed embodiment, where the shunt coils to the right of a given switch point (Fig. 1) are put in series with telephone T, is very advantageous because it permits the use of a telephone receiver of any resistance, for the purpose of measuring the relative strength of two or more circuits. (This is true even when the meter is designed, as above, on the basis of a telephone having a specified resistance). That is, with a telephone of any resistance other than the 2000 ohms assumed above, readings with switch S at points 2, 3, 4, etc., will give audibilities proportional to those steps, even although such readings will not be in accurate multiples of unit audibility. In the case of many measurements in radio it is not necessary to obtain readings which are in multiples of unit audibility, all that is desired in the case of such measurements being an accurate comparison of the effective values of different supplied currents.

Within the broader aspects of the invention, however, the impedances of the shunt may be removed from the shunt in any other of the known ways than by shifting to series with the telephone (as by short-circuiting or open-circuiting) in which case the impedance values will be proportioned differently from the formulæ and tables above. In such cases, however, the telephone used with the meter must have the resistance used in calculating the impedance values; and then the meter may be used either to obtain readings of multiple unit audibility or to obtain readings of relative audible effect of two or more supplied currents of different values. In the latter case, the meter is operated as in the former case, but it is used on each of the different currents supplied, the readings being taken from the switch points on which switch S rests when the telephone response is just barely audible, and those readings show the relative values of the supplied currents in terms of their ability to operate the telephone. The impedance values in this general case will be determined by the impedance of the telephone which is to be used with the meter, and will be simply fractional parts of the telephone impedance which parts correspond with the audibility steps (switch points) desired by the designer.

There are similarities between, on the one hand, audibility meters of the prior art and of this invention, and on the other hand, between this invention and the various galvanometer shunts which have been known and used for many years for the purpose of definitely reducing too heavy currents desired to be measured by sensitive and delicate galvanometers. These similarities are merely superficial, however, not only as to the purpose and mode of use but also as to structure and arrangement of parts, particularly in the case of this invention; and the appended claims define my invention in distinction not only from prior audibility meters but from all other apparatus heretofore known in the electrical art.

I claim:

1. As an improvement upon a meter of the audible effect of electric currents on an electromagnetic telephone receiver, wherein resistances, proportionate to the resistance of the telephone in order to permit various audibility readings, are placed in shunt to the telephone, said improvement comprising means for increasing the accuracy of such readings consisting of resistances for said shunt having the form of impedance coils possessing electric and magnetic properties similar to those of the telephone receiver itself; and switching means for shifting said impedances progressively from shunt to series relation to the telephone, whereby relative audibility readings may be obtained irrespective of the resistance of the telephone receiver employed.

2. As an improvement upon a meter of the audible effect of electric currents on an electromagnetic telephone receiver, wherein resistances proportioned to the resistance of the telephone in order to permit various audibility readings, are placed in shunt to the telephone; said improvement comprising means for increasing the accuracy of such readings consisting of resistances for said shunt having the form of impedance coils possessing electric and magnetic properties similar to those of the telephone receiver itself, and consisting of additional impedance coils connected in series with both the telephone and its said shunt and having their impedances proportioned to permit compensation for the variations of said shunt and thereby maintain constant the current to be measured; said compensating impedances also having electric and magnetic properties similar to those of the telephone receiver; and switching means whereby the coils in both said sets of shunt and series coils may be operated simultaneously 3. As an improvement upon a meter of the audible effect of electric currents on an electromagnetic telephone receiver, wherein resistances proportioned to the resistance of the telephone in order to permit various audibility readings are placed in shunt to the telephone; said improvement comprising means for increasing the accuracy of such readings consisting of resistances for said shunt having the form of impedance coils possessing electric and magnetic properties similar to those of the telephone receiver itself.

4. As an improvement upon a meter of the audible effect of electric currents on an electromagnetic telephone receiver, wherein resistances, proportioned to the resistance of the telephone in order to permit various audibility readings are placed in shunt to the telephone; said improvement comprising means for increasing the accuracy of such readings consisting of resistances arranged to be connected in series with both the telephone and its said shunt and proportioned to permit compensation for the variations of said shunt and thereby maintain constant the current to be measured; and switching means whereby the shunt and series resistances may be operated simultaneously.

5. As an improvement upon a meter of the audible effect of electric currents on a telephone receiver, wherein resistances proportioned to the resistance of the telephone in order to permit various audibility readings are placed in shunt to the telephone, said improvement comprising means for increasing the accuracy of such readings consisting of resistances for said shunt possessing alternating current reactance and having electrical properties similar to those of the telephone receiver itself.

GREENLEAF WHITTIER PICKARD.

In the presence of—
 A. B. HEALY,
 M. A. FLANDERS.